Figure 1:
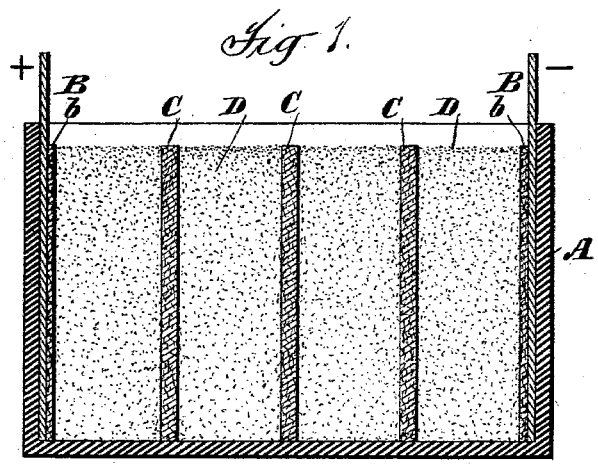

No. 717,610. PATENTED JAN. 6, 1903.
L. PAGET.
STORAGE BATTERY AND METHOD OF PREPARING ELECTRODES THEREFOR.
APPLICATION FILED JAN. 10, 1900.
NO MODEL.

UNITED STATES PATENT OFFICE.

LEONARD PAGET, OF NEW YORK, N. Y., ASSIGNOR, BY MESNE ASSIGNMENTS, TO CHARLES COSTER, OF NEW YORK, N. Y.

STORAGE BATTERY AND METHOD OF PREPARING ELECTRODES THEREFOR.

SPECIFICATION forming part of Letters Patent No. 717,610, dated January 6, 1903.

Application filed January 10, 1900. Serial No. 912. (No model.)

*To all whom it may concern:*

Be it known that I, LEONARD PAGET, a citizen of the United States, residing at New York, county of New York, and State of New York, have invented certain new and useful Improvements in Storage Batteries and Methods of Preparing Electrodes Therefor, fully described and represented in the following specification and the accompanying drawings, forming a part of the same.

The object of the present invention is to provide an improved battery element or electrode which shall possess the advantages of a true Planté plate in respect to rapid charge and discharge and avoidance of sulfation between the active material and a metal support, if the latter be used, and which shall be strong and durable under the conditions of use, while at the same time avoiding the long period of formation required for producing plates by the Planté process.

The broader features of my invention are applicable in connection with either unipolar or bipolar electrodes or elements adapted to form electrodes of either class and either with or without a metallic or other support for the active material; but one of the specific objects of the invention is to provide an improved multicellular battery of that class in which bipolar intermediate electrodes are used with the active material forming the sole electrical conducting connection between opposite sides of the electrode and an improved bipolar electrode for use in such batteries. Such a battery is described in my prior patent, granted June 13, 1899, No. 627,009. By the present invention I am enabled to provide an improved battery of this class and a cheap, efficient, and durable intermediate plate for use therein, in which plate no support for the active material need be used; but the plate may consist of a body of material which is active throughout in the operation of the battery.

The invention includes, therefore, certain specific features consisting of improvements in this class of battery and methods of preparing intermediate bipolar electrodes therefor.

I have discovered that by compressing spongy lead to the density of sheet lead, which is 11.4, or approximately such density, a plate of material may be secured that will not disintegrate under the action of a storage battery and will secure substantially the same battery action as the active material of a Planté plate, and I thus secure substantially a Planté plate of great durability and without the slow and expensive operation of forming by reversals, as in the Planté process.

To secure the density required, each layer or film of metal produced by the compression must be very thin, so that only a comparatively small capacity per unit of surface can be secured without compressing successive layers. In compressing the spongy lead, therefore, I preferably apply and compress successive thin layers or films of the spongy lead, so as to produce the thickness of active material desired. Each of these successive compressed layers or films must be of such small thickness as to be compressed to a uniform density throughout, and I have found in practice that they should not be more than about two one-hundredths of an inch in thickness and preferably are thinner than this.

I have found in practice that a direct pressure—that is, the pressure of a platen-press as distinguished from that of pressure-rollers—is necessary to secure the result desired, and with a platen-press have found that a pressure of from two to three tons is sufficient to compress spongy lead in such thin layers to a specific gravity of ten or more and that by such compression on successive layers of this thickness a plate may be built up to the thickness desired for an intermediate bipolar plate that will be very satisfactory under conditions of battery use; but I preferably use a greater pressure, so as to secure a greater density with corresponding greater strength and durability. The density may be somewhat less and fairly satisfactory results be secured; but a specific gravity below ten involves loss of durability, and I find that if the specific gravity be less than about nine and one-half the element, either bipolar or unipolar, will be unsuitable for my purpose.

The spongy lead is preferably applied on opposite sides of the element for successive compressions, and if the same pressure be used for the outer as for the inner layers it is obvious that the plate will be of a density increasing from the surface inward, and this is the preferable construction and forms an important feature of my invention in its more limited aspect, as the plate thus produced resembles more clearly a true Planté plate and secures more fully the advantages of such a plate, especially in regard to the quicker charge and discharge and likewise as to sulfation, if a metallic support be used. Instead of using the same pressure for the successive layers I may reduce the pressure for the successive layers and then press the plate finally with a heavier pressure, substantially the same result of a density increasing from the surface inward being secured. This increase of density is comparatively small and probably does not amount to one unit of specific gravity.

I preferably use the ordinary spongy lead in producing my battery electrodes or elements, by which I mean finely-granulated or electrolytically formed, reduced, or deposited metallic lead or chemically-precipitated metallic lead. All such metallic lead may be included under the term "finely-divided" lead, and I find that with such material compressed to the density stated the active constituents of a suitable electrolyte will penetrate the material, so as to secure the electrical action required. In the case of a bipolar intermediate electrode I have found that the whole body of active material is converted by the charging current, one side of the plate being positively charged and the other negatively charged.

Figure 2:

For an illustration of the features of the present invention I have shown in Figure 1 of the accompanying drawings a storage battery of general construction, such as that shown in Patent No. 627,009 above referred to, with the present invention applied thereto. Fig. 2 is a much enlarged sectional detail of a plate, illustrating the preferred construction with successive layers of varying density.

In the drawings, A is the battery-case; B, the end electrodes of opposite polarities; C, the intermediate bipolar electrodes, and D absorbent material carrying the electrolyte and filling the spaces between the electrodes. It will be understood that any suitable electrolyte may be used—for instance, a sulfuric-acid solution—and that the absorbent material may be omitted or may be of any suitable character.

Each of the intermediate electrodes C consists of finely-divided lead compressed as above described, these electrodes preferably being made of successive thin layers compressed on each other to form an electrode of the desired thickness, although a single thin layer may be used within the invention, considered broadly. I preferably use electrodes built up of successive layers to a thickness of about one-quarter of an inch and with the density increasing from the surface inward, as above described.

The end electrodes B are preferably made in accordance with the broader features of my invention and are shown as formed of conducting and supporting plates, with a facing, $b$, of compressed finely-divided lead, forming the active material. This facing may be a single thin layer of finely-divided lead compressed as above described, or two or more layers may be compressed together to increase the thickness of active material and the capacity per unit of surface of the end electrodes. The total thickness of such active material on these end electrodes should be quite small, however, for utilization of the whole body of active material, and I have found in practice that the total thickness should not exceed about one twenty-fifth of an inch, if the full depth of the compressed material is to be fully active in the battery.

It will be understood that my improved intermediate bipolar electrodes may be used with end electrodes of any other suitable construction; but the best results are secured by the use of both end and intermediate electrodes in which the active material consists of finely-divided lead compressed as described.

What I claim is—

1. A storage-battery element in which the active material or material adapted to become active consists of finely-divided lead compressed to a density approximately that of sheet-lead, substantially as and for the purpose set forth.

2. A storage-battery element in which the active material or material adapted to become active consists of finely-divided lead compressed to a density approximately that of sheet-lead with the density increasing from the surface inward, substantially as and for the purpose set forth.

3. A storage-battery element in which the active material or material adapted to become active consists of a body of finely-divided lead formed of successive thin layers or films compressed to a density approximately that of sheet-lead, substantially as and for the purpose set forth.

4. A storage-battery element in which the active material or material adapted to become active consists of a body of finely-divided lead formed of successive thin layers or films compressed to a density approximately that of sheet-lead and increasing in density from the surface of the element inward, substantially as and for the purpose set forth.

5. An intermediate bipolar electrode for storage batteries having the sole electrical conducting connection between opposite sides of the electrode formed by finely-divided lead compressed to a density approximately that of sheet-lead, substantially as and for the purpose set forth.

6. An intermediate bipolar electrode for storage batteries having the sole electrical conducting connection between opposite sides of the electrode formed by finely-divided lead compressed to a density approximately that of sheet-lead with the density increasing from the surface inward, substantially as and for the purpose set forth.

7. An intermediate bipolar electrode for storage batteries having the sole electrical conducting connection between opposite sides of the electrode formed by a body of finely-divided lead consisting of successive thin layers or films compressed to a density approximately that of sheet-lead, substantially as and for the purpose set forth.

8. An intermediate bipolar electrode for storage batteries having the sole electrical conducting connection between opposite sides of the electrode formed by a body of finely-divided lead consisting of successive thin layers or films compressed to a density approximately that of sheet-lead and increasing in density from the surface of the plate inward, substantially as and for the purpose set forth.

9. A storage-battery element consisting solely of a mass of finely-divided lead compressed to a density approximately that of sheet-lead, substantially as and for the purpose set forth.

10. A storage-battery element consisting solely of a mass of finely-divided lead formed of successive thin layers or films compressed to a density approximately that of sheet-lead, substantially as and for the purpose set forth.

11. A storage-battery element consisting solely of a mass of finely-divided lead formed of successive thin layers or films compressed to a density approximately that of sheet-lead and increasing in density from the surface of the plate inward, substantially as and for the purpose set forth.

12. The method of producing active material for storage batteries, which consists in compressing finely-divided lead to approximately the density of sheet-lead, substantially as and for the purpose set forth.

13. The method of producing active material for storage batteries, which consists in compressing finely-divided lead to a density approximately that of sheet-lead with the density of the compressed material increasing from the surface inward, substantially as and for the purpose set forth.

14. The method of producing active material for storage batteries, which consists in compressing finely-divided lead in successive thin layers or films to approximately the density of sheet-lead, substantially as and for the purpose set forth.

15. The method of producing active material for storage batteries, which consists in compressing finely-divided lead in successive thin layers or films to a density approximately that of sheet-lead with the density of the compressed material increasing from the surface inward, substantially as and for the purpose set forth.

16. The method of preparing a bipolar storage-battery electrode which consists in compressing finely-divided lead to a density substantially that of sheet-lead and passing a forming or charging current from one face to the other through the plate thus formed and through a suitable electrolyte on the opposite faces of the plate with said compressed finely-divided lead constituting the sole conducting connection between the opposite sides of the electrode, substantially as and for the purpose set forth.

17. The method of preparing a bipolar storage-battery electrode which consists in compressing finely-divided lead in successive thin layers or films to a density substantially that of sheet-lead and passing a forming or charging current from one face to the other through the plate thus formed and through a suitable electrolyte on the opposite faces of the plate with said compressed finely-divided lead constituting the sole conducting connection between the opposite sides of the electrode, substantially as and for the purpose set forth.

18. The method of preparing a bipolar storage-battery electrode which consists in compressing finely-divided lead to a density substantially that of sheet-lead with the density of the material increasing from the surface inward and passing a forming or charging current from one face to the other through the plate thus formed and through a suitable electrolyte on the opposite faces of the plate with said compressed finely-divided material constituting the sole conducting connection between the opposite sides of the electrode, substantially as and for the purpose set forth.

19. The method of preparing a bipolar storage-battery electrode which consists in compressing finely-divided lead in successive thin layers or films to a density substantially that of sheet-lead with the density of the material increasing from the surface inward and passing a forming or charging current from one face to the other through the plate thus formed and through a suitable electrolyte on the opposite faces of the plate with said compressed finely-divided material constituting the sole conducting connection between the opposite sides of the electrode, substantially as and for the purpose set forth.

In testimony whereof I have hereunto set my hand in the presence of two subscribing witnesses.

LEONARD PAGET.

Witnesses:
C. J. SAWYER,
A. A. V. BOURKE.